United States Patent [19]

Shoji et al.

[11] Patent Number: 5,715,284
[45] Date of Patent: Feb. 3, 1998

[54] DIGITAL RADIO COMMUNICATIONS RECEIVER

[75] Inventors: Takanori Shoji; Yasuyuki Nagashima; Masayuki Doi, all of Tokyo, Japan

[73] Assignee: Mitsubishi Denki Kabushiki Kaisha, Japan

[21] Appl. No.: 738,050

[22] Filed: Oct. 25, 1996

[30] Foreign Application Priority Data

Mar. 13, 1996 [JP] Japan ................................. 8-056297

[51] Int. Cl.$^6$ ............................. H04L 7/00; H04J 3/06
[52] U.S. Cl. ................................. 375/365; 370/514
[58] Field of Search ........................ 375/365, 368, 375/354; 370/514, 520; 348/513

[56] References Cited

U.S. PATENT DOCUMENTS

| 5,450,413 | 9/1995 | Hazama | 370/514 |
| 5,619,507 | 4/1997 | Tsuda | 375/365 |
| 5,646,947 | 7/1997 | Cooper et al. | 370/514 |

OTHER PUBLICATIONS

"Radio Transmission in the American Mobile Satellite System", American Institute of Aeronautics and Astronautics, Inc., pp. 280–294 (1994).

"Personal Handy Phone System", Research & Development Center for Radio Systems (RCR), RCR Standard Version 1, RCR STD-28, pp. 67, 78, 93 (1993).

*Primary Examiner*—T. Ghebretinsae
*Attorney, Agent, or Firm*—Rothwell, Figg, Ernst & Kurz, P.C.

[57] ABSTRACT

A digital radio communications receiver for determining a frame structure even in the event of miss or false detection of a frame structure flag. The receiver, for use in a digital communications stem having two or more frame structures, comprises unique word detector module for detecting a unique word from a received bit string, a receive timing controller for timing controlling a received frame based on the unique word detection information from the unique word detector module, a frame synchronization determining module for determining the establishment of the synchronization of the received frame based on the unique word detection information from the unique word detector module and the frame synchronization guard level and for outputting the determination results as frame synchronization information, and a frame structure determining module for determining the frame structure based on the unique word detection information from the unique word detector module and for outputting the determination results as frame structure information, whereby the frame structure is predicted based on the intervals and phase of the unique words without the need for determining the frame structure flag.

5 Claims, 14 Drawing Sheets 5,715,284

1
DIGITAL RADIO COMMUNICATIONS RECEIVER

BACKGROUND OF THE INVENTION

1. Field of the Invention

The present invention relates to a digital radio communications receiver that predicts the structure of a received frame based on the phase and intervals of sync words picked up.

2. Description of the Related Art

In digital radio communications, correctly received information is extracted by detecting a received signal to extract received bit string and picking up a frame timing in the received bit string.

Typically, the detection of the frame timing and frame synchronization are performed by detecting a bit string that exhibits an outstanding autocorrelation in a predetermined position in frames, namely, by detecting a sync word.

A sync word is also referred to as a unique word, and the unique word is abbreviated UW in the drawings and the discussion that follows.

A unique word is detected by comparing a received bit string with the unique word bit string prepared at a receiver end. An unmatched bit count between both strings equal to or smaller than a predetermined threshold (hereinafter referred to as correlation threshold) determines that a unique word is detected.

On the other hand, an unmatched bit count at the timing of the unique word exceeds the correlation threshold determines that a unique word is missed.

When a frame synchronization is established, the receiver is capable of approximately predicting the position of the unique word. When the frame synchronization is established, a gate called an aperture is set up, and the probability of erroneous detection of the unique word is kept lowered by performing the valid detection of the unique word on or in the vicinity of the position of the unique word.

The frame synchronization is established by detecting the unique word at the predetermined positions for the specified number of consecutive frames. This operation is called backward guard and the specified number of frames is called the backward guard level. As the backward guard level is increased, the erroneous frame synchronization is less likely to take place, making higher the reliability of frame synchronization, but the time required to establish the frame synchronization gets longer. Conversely, as the guard level is decreased, the time required to establish the frame synchronization gets shorter but the erroneous frame synchronization is more likely to take place.

The detection of a frame missynchronzation is performed by verifying that the unique word is consecutively missed for the specified number of frames at the position where the unique word is supposed to appear. This operation is called forward guard, and the specified number of frames is called the forward guard level. As the forward guard level is increased, the probability of frame missynchronization due to degradation of channel quality or the like is reduced, but the time required to detect the frame missynchronization, when it actually takes place, is prolonged. Conversely, as the forward guard level is decreased, the time required to detect the frame missynchronization is shortened while the probability of the determination that a missynchronization is erroneously detected is heightened even in the situation where the frame synchronization needs to be maintained.

Some digital radio communications systems changes the frame structure depending on communications conditions.

2

For example, in the system employing a voice activation technique, frames are transmitted only when voice remains significant, and no frames are in principle transmitted when no voice is recognized. In such a case, however, to maintain frame synchronization, a short burst containing a unique word is transmitted at regular intervals. Typically, this interval is different from the frame length.

When the frame structure changes depending on communications conditions as described above, a transmitter end is required to notify of the change in the frame structure. Available as methods of notifying of frame structure changes are one in which a predetermined bit string is set up for notifying of the frame structure in a frame and another method in which a bit string (hereinafter referred to as a frame structure flag) for notifying a change, when it takes place, is inserted.

FIG. 10 is a block diagram showing an example of the configuration of a privately known but unpublished art digital radio communications receiver which performs frame synchronization and frame structure prediction.

Referring to FIG. 10, a unique word detector module 1 detects a unique word from a received bit string, based on the timing information from an aperture control module to be described later and the correlation threshold from a correlation threshold setting module to be described later. The radiowave received by a receiving antenna 100 is fed to a down-converter 101 which outputs a signal in an intermediate frequency bandwidth. A detector 102 detects the intermediate frequency signal and then outputs the received bit string to the unique word detector module 1. The aperture control module 2 outputs the timing information that controls the timing at which the unique word detector module 1 attempts to detect the unique word. In response to the aperture width from an aperture width setting module to be described later and the received timing information from a timing control module to be described later, the aperture control module 2 generates the timing information that is output to the unique word detector module 1.

There are further shown in FIG. 10 the timing control module 3 that outputs the receive timing information of the received signal in response to the unique word detection information from the unique word detector module 1, a frame synchronization guard level setting module 4 that sets frame synchronization determination conditions, namely, the backward guard level that is the number of consecutive detections of unique word and the forward guard level that is the number of consecutively misses detections of unique word (both levels are hereinafter collectively referred as the guard level), and a frame synchronization determining module 5 that results in the frame synchronization information, based on the unique word detection information from the unique word detector module 1 and the guard level from the frame synchronization guard level setting module 4.

There are yet further shown in FIG. 10 an aperture width setting module 6 that sets an aperture width as a time width within which the unique word detector module 1 attempts to detect a unique word, based on the unique word detection information from the unique word detector module 1 and the frame synchronization information from the frame synchronization determining module 5, a correlation threshold setting module 7 that sets the correlation threshold of unique word detection conditions, based on the unique word detection information from the unique word detector module 1 and the frame synchronization information from the frame synchronization determining module 5, a received signal extractor module 8 that extracts the received signal from the received bit string output by the detector 102 at the timing designated by the timing control module 3, and a frame structure determining module 9 for detecting the frame structure flag of the received signal to determine whether or not the frame structure changes.

The operation of the known digital radio communications receiver thus constructed is now discussed.

The radiowave received at the receiving antenna 100 is converted into an intermediate frequency signal by the down-converter 101, which is then fed, as a received signal, to the detector 102. The detector 102 demodulates the received signal and outputs the received bit string.

The unique word detector module 1 receives the received bit string, correlates the received bit string with the unique word at the timing set by the aperture control module 2, detects the unique word and determines the phase of the unique word from the number of erratic bits and their correlation threshold, and then outputs the determination results as the unique word detection information.

The timing control module 3 controls the receive timing based on the unique word detection information.

The frame synchronization determining module 5 determines the frame synchronization state using the number of consecutive detections/misses of the unique word of the unique word detection information designated by the guard level setting module 4, and outputs the determination results as the frame synchronization information.

Referring to the unique word detection information and the frame synchronization information, the aperture width setting module 6 sets and outputs the aperture width that is used at the next attempts to detect.

Referring to the unique word detection information and the frame synchronization information, the correlation threshold setting module 7 sets and outputs the correlation threshold that is used at the next attempts to detect.

To determine whether the frame structure changes, the frame structure determining module 9 detects the frame structure flag indicative of the frame structure of the received signal that is extracted by the received signal extractor module 8 from the received bit string output by the detector 102 at the timing designated by the timing control module 3.

Discussed next is how the frame structure is recognized when the known art digital radio communications receiver performs frame synchronization control.

FIG. 11 shows an example of the change in the frame structure depending on communications conditions. Part of FIG. 11 herein shows a simplified version of FIG. 2 that is presented in a paper entitled "RADIO TRANSMISSION IN THE AMERICAN MOBILE SATELLITE SYSTEM" (A COLLECTION OF TECHNICAL PAPERS, AIAA-94-0945-CP, pp 280-294, 1994).

FIG. 11 shows a unique word 17, a frame structure flag 18-a indicative of a frame structure 1 and inserted at the change from a frame structure 2 to the frame structure 1, and a frame structure flag 18-b indicative of the frame structure 2 and inserted at the change from the frame structure 1 to the frame structure 2.

In the frame structure in FIG. 11, a unit or interval of the frame structure 1 delimited by unique words is called a subframe, and four subframes make up a frame. The interval between unique words in the frame structure 2 is identical to the frame length. In FIG. 11, in other words, the frame structure 1 has a unique word on a per subframe basis, and the frame structure 2 has a unique word on a per frame basis.

FIGS. 12 and 13 show examples of the recognition of the frame structure in which when the frame structure changes, a frame structure flag notifying of it is transmitted only once. FIG. 12 shows the example of the false detection of a frame structure flag, and FIG. 13 shows the example of a miss of a frame structure flag.

In FIG. 12, the frame structure determining module 9 suffers the false detection of a frame structure flag and thus erroneous determination of frame structure. The frame structure determining module 9 thus remains unable to receive a frame structure flag and thus unable to recognize correctly the frame structure until the frame structure is changed next.

In FIG. 13, the frame structure determining module 9 misses a frame structure flag and erroneously determines the frame structure. In this case, again, the frame structure determining module 9 remains unable to recognize correctly the frame structure until the next change in frame structure.

FIG. 14 shows an example of the effect of the above faulty determinations.

In the detection failure of the frame structure flag in FIG. 14, the frame synchronization forward guard level is 2.

As shown in FIG. 14, with the miss of the frame structure flag, the receiver attempts to receive the frame structure 1 though the frame is already changed from frame structure 1 to frame structure 2. Since the unique word interval is different between the frame structure 1 and the frame structure 2, the receiver suffers a detection failure of unique word in an attempt to detect the unique word with the unique word interval of the frame structure 1. Such a state continues until the frame is changed from frame structure 2 to frame structure 1, and it is highly likely that a missynchronization would take place in the course of repeated detection failures of the unique word.

In the known digital radio communication receiver thus constructed, when the flag notifying of the change in the frame structure is transmitted only once, followed by the failed or false detection of the flag, the receiver remains unable to correctly recognize the frame structure until the frame structure changes later again. Furthermore, the faulty recognition of the frame structure may cause the frame synchronization control to malfunction, possibly leading to a missynchronization.

SUMMARY OF THE INVENTION

The present invention has been developed to solve this problem, and it is therefore an object of the present invention to provide a digital radio communications receiver that predicts correctly a frame structure even in case of a false detection or miss of a frame structure flag.

To achieve the above object, the digital radio communications receiver of the present invention for use in a digital communications system having two or more frame structures on a single channel, comprises unique word detector means for detecting a unique word from a received bit string, receive timing control means for timing controlling a received frame timing based on the unique word detection information from the unique word detector means, frame synchronization determining means for determining the establishment of the synchronization of the received frame based on the unique word detection information from the unique word detector means and the frame synchronization guard level and for outputting the determination results as frame synchronization information, and frame structure determining means for determining the frame structure based on the unique word detection information from the unique word detector means and for outputting the determination results as frame structure information, whereby the frame structure is predicted based on the intervals and phase of the unique words without the need for determining the frame structure flag.

The frame synchronization determining means causes the frame synchronization to transition to the state appropriate for the frame structure by selecting the mode of the frame synchronization control based on the frame structure information from the frame structure determining means. A digital radio communications receiver having excellent frame synchronization characteristics thus results.

The communications receiver further comprises guard level setting means for setting the frame synchronization guard level that is the number of consecutive detections or the number of consecutive misses of the unique word of the frame synchronization determining condition based on the frame structure information from the frame structure determining means. The frame synchronization guard level appropriate for the frame structure is thus set. A digital radio communications receiver having excellent frame synchronization characteristics thus results.

The communications receiver further comprises aperture width setting means for setting an aperture width that is a time width within which the unique word detector module attempts to detect a unique word based on the unique word detection information from the unique word detector means, the frame structure information from the frame structure determining means and the frame synchronization information from the frame synchronization determining means. The aperture width appropriate for the frame structure is set. A digital radio communications receiver having excellent frame synchronization characteristics thus results.

The communications receiver further comprises correlation threshold setting means for setting the correlation threshold of unique word detection conditions, based on the unique word detection information from the unique word detector means, the frame structure information from the frame structure determining means and the frame synchronization information from the frame synchronization determining means. The correlation threshold appropriate for the frame structure is set. A digital radio communications receiver having excellent frame synchronization characteristics thus results.

DESCRIPTION OF THE PREFERRED EMBODIMENTS

Embodiment 1

Figure 1:
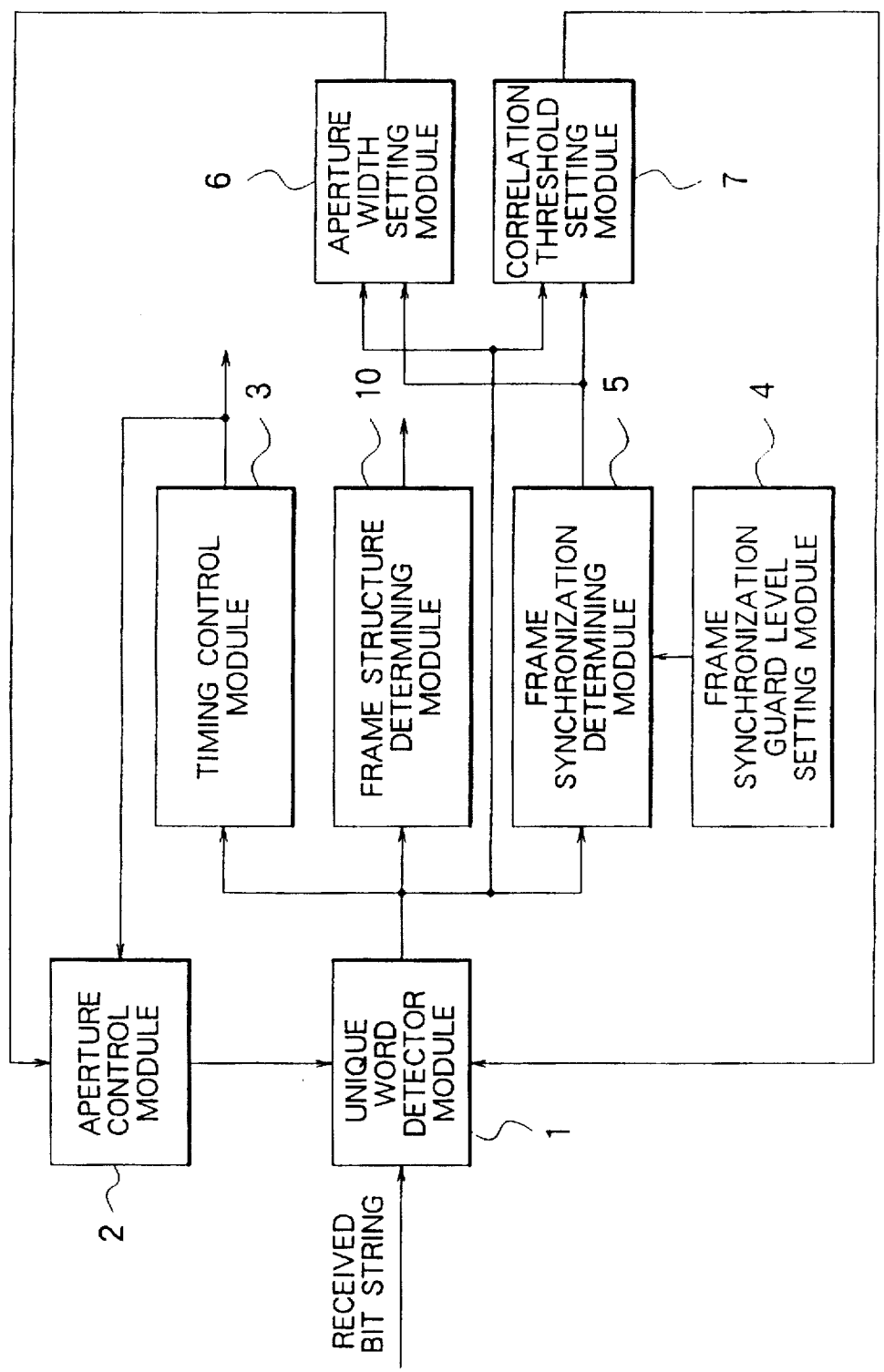
FIG. 1 is a block diagram showing the configuration of the digital radio communications receiver according to an embodiment of the present invention.

FIG. 1 is the block diagram of the digital radio communication receiver in the embodiment 1 of the present invention.

Figure 10:
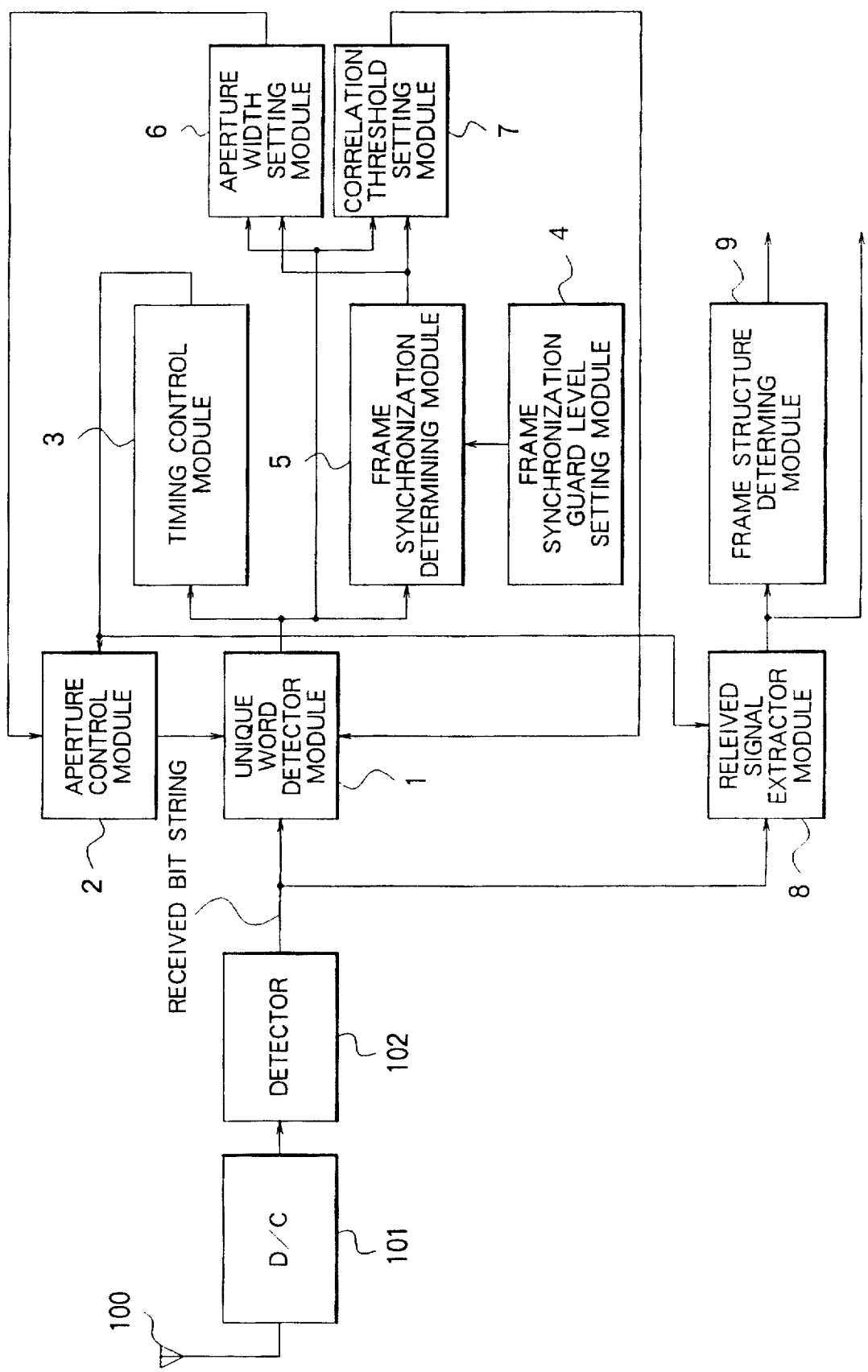
FIG. 10 is the block diagram showing the configuration of the privately known but unpublished art digital radio communications receiver.
Figure 11:
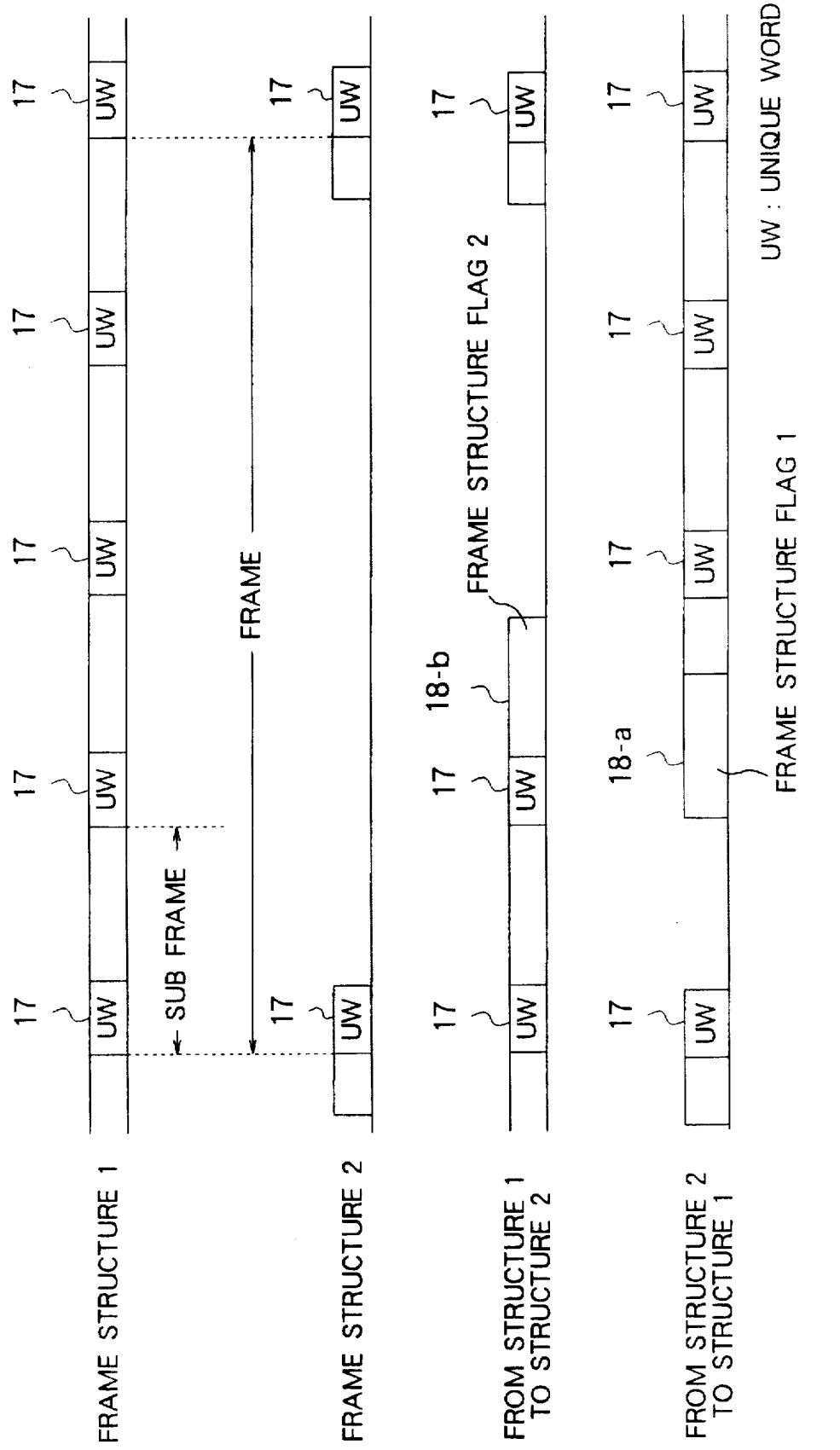
FIG. 11 illustrates the structure of frames and bursts used in the known digital radio communications.
Figure 12:
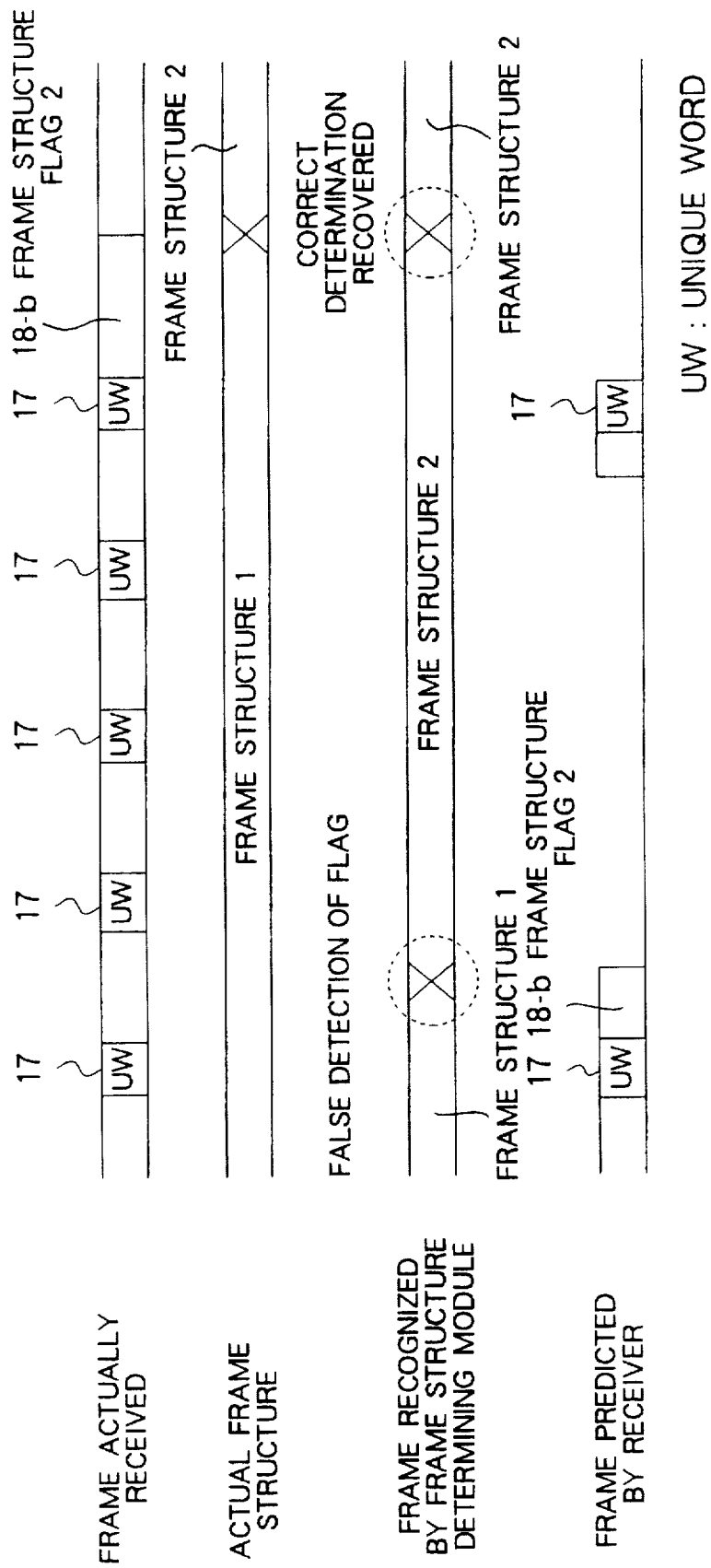
FIG. 12 illustrates the false detection of the frame structure flag in the known art.
Figure 13:
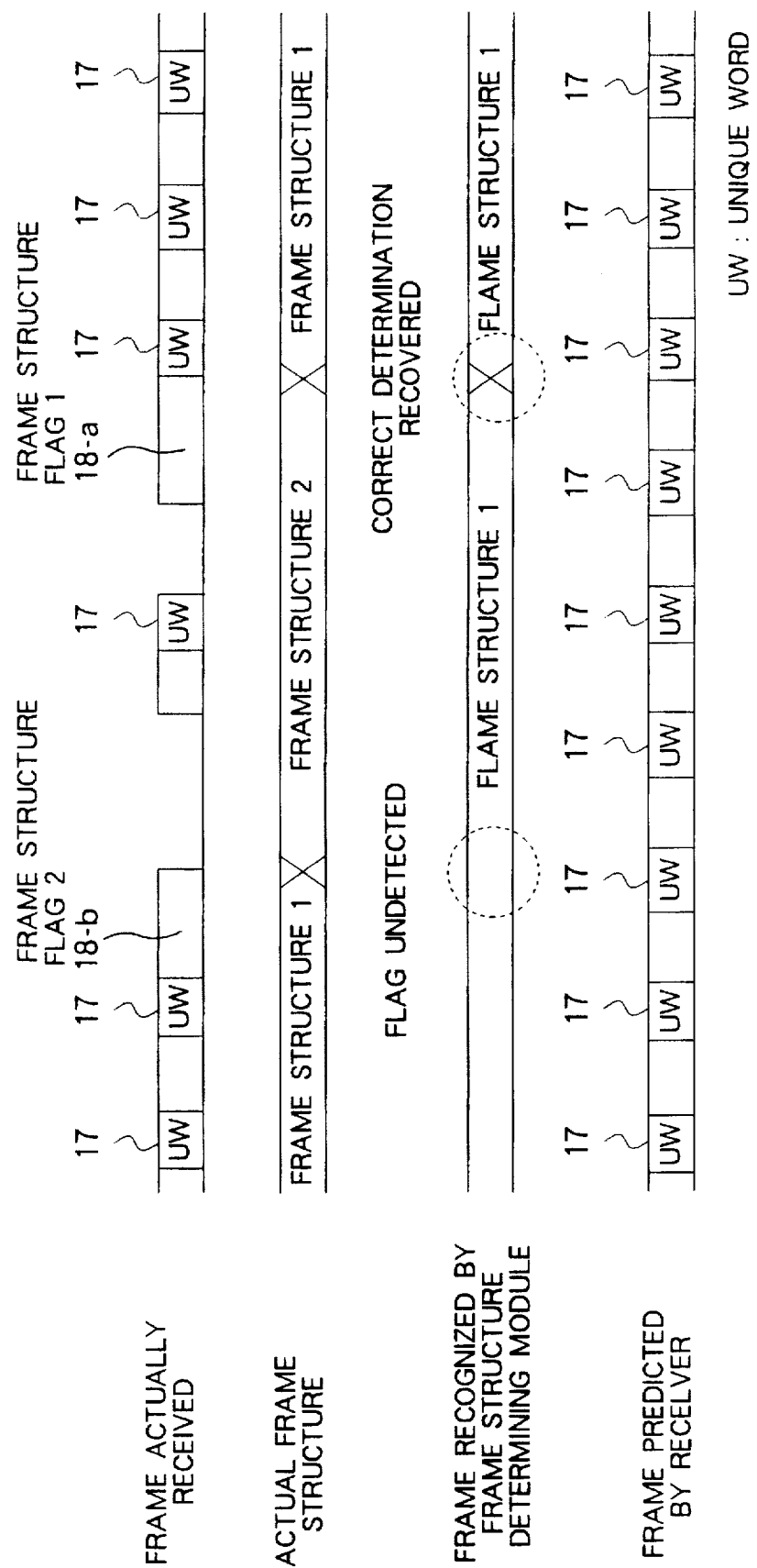
FIG. 13 illustrates the aborted detection of the frame structure flag in the known art.
Figure 14:
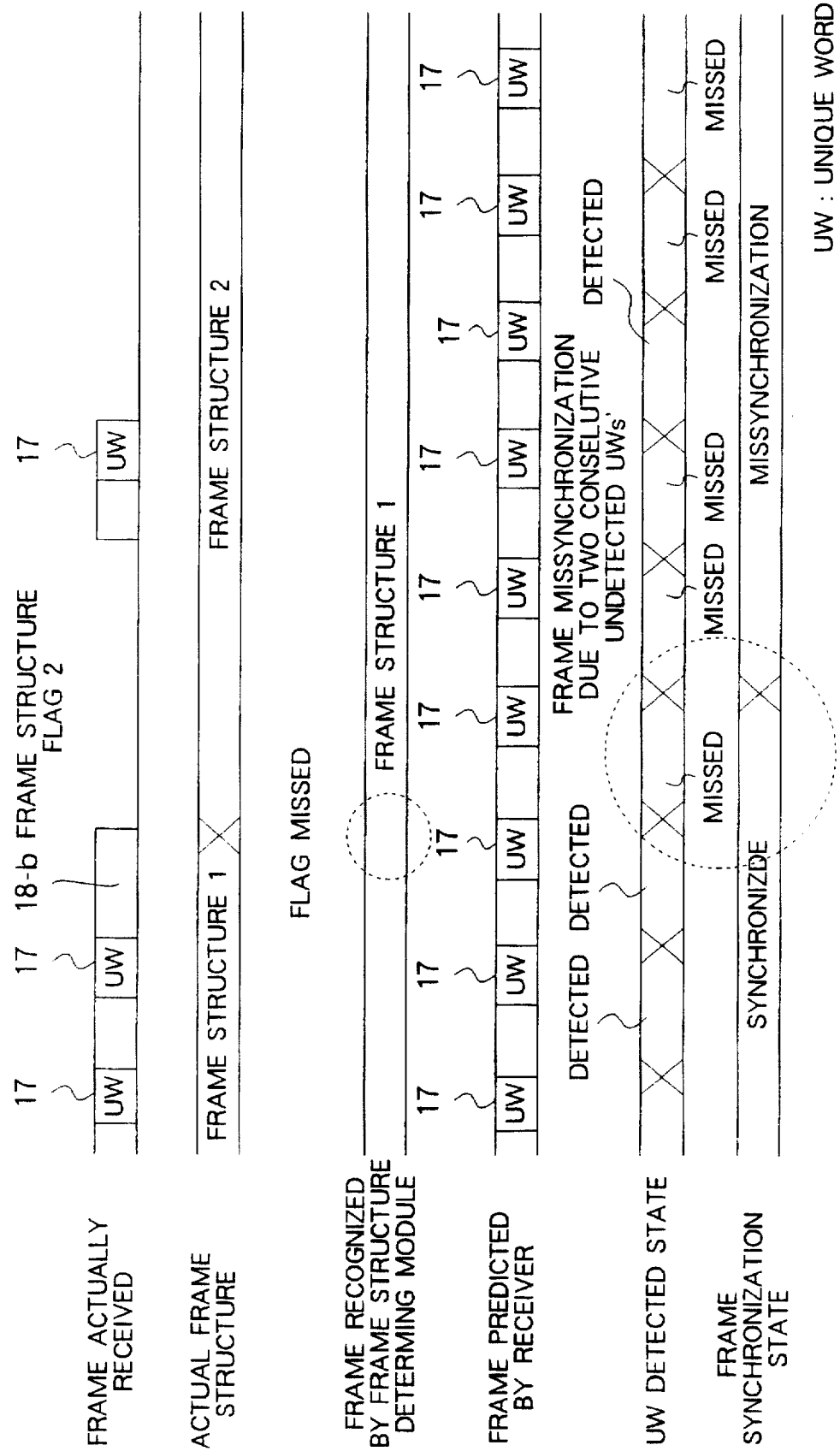
FIG. 14 illustrates the effect of an example of the miss of the frame structure flag.

In FIG. 1, components identical to those with reference to the known art in FIG. 10 are designated with the same reference numerals. Newly included herein is a frame structure determining module 10 for determining the frame structure based on the unique word detection information from the unique word detector module 1.

In the same way as in the one in FIG. 10, in the digital communications receiver in FIG. 1, the received bit string fed to the unique word detector module 1 is derived by detecting, with the detector 102, the received signal in the intermediate frequency band that is output by the downconverter 101 in response to the radiowave received at the receiving antenna 100. The receiver also comprises the unshown received signal extractor module 8 for extracting the received signal from the received bit string output by the detector 102 at the timing designated by the timing control module 3.

The operation of the embodiment 1 is now discussed.

Referring to FIG. 1, the received bit string is fed to the unique word detector module 1. The unique word detector module 1 correlates the received bit string with the unique word at the timing set by the aperture control module 2, and determines the success/failure in detection of the unique word and the phase of the unique word based on the correlation value and the correlation threshold set by the correlation threshold setting module 7, and outputs the determination results as the unique word detection information.

The timing control module 3, aperture control module 2 and aperture width setting module 6 constitute the receive timing control means that outputs timing information for controlling the receive timing of the unique word detector module 1. The timing control module 3 controls the receive timing according to the unique word detection information.

The frame synchronization determining module 5 determines the frame synchronization state according to the number of consecutive detections or consecutive miss of the unique word detection information designated by the guard level setting module 4, and outputs the determination results as the frame synchronization information.

The aperture width setting module 6 outputs the aperture width which is going to be used when the unique word detector module 1 attempts to detect the next unique word based on the unique word detection information and the frame synchronization information.

The correlation threshold setting module 7 outputs the correlation threshold which is going to be used when the next unique word is detected based on the unique word detection information and the frame synchronization information.

The frame structure determining module 10 predicts the frame structure based on the detected intervals and phase of the unique words in the unique word detection information.

The embodiment 1 is different from the known art in that the frame structure determining module 10 predicts the frame structure based on the detected intervals and phase of the unique words in the unique word detection information.

A method of predicting the frame structure based on the detected intervals and phase of the unique words in the unique word detection information is now discussed.

Figure 2:
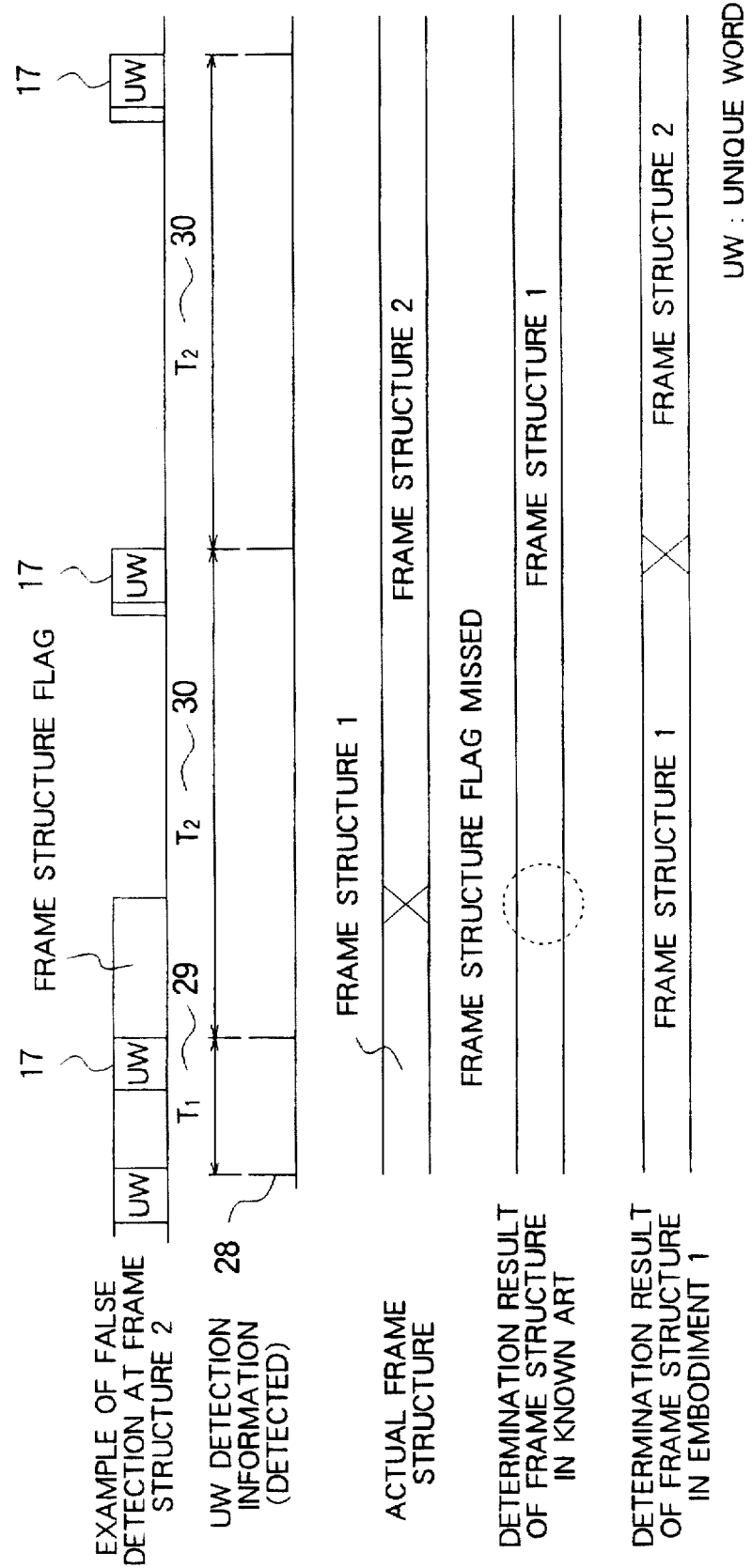
FIG. 2 illustrates an aborted detection of a frame structure flag in the embodiment 1.

FIG. 2 shows the example of the miss detection of the frame structure flag.

Referring to FIG. 2, part of the unique word detection information is a detected pulse 28 that is output when a unique word is detected. There are also shown intervals 29 at which each unique word is transmitted in the frame structure 1 and intervals 30 at which each unique word is transmitted in the frame structure 2.

When the frame is changed from frame structure 1 to frame structure 2 and if the frame structure flag misses in the known art, and the determination of the frame structure remains unchanged from the frame structure 1. In the embodiment 1, however, it is determined that the frame is at structure 2 based on the matter that the unique word is detected at intervals of T2.

Figure 3:
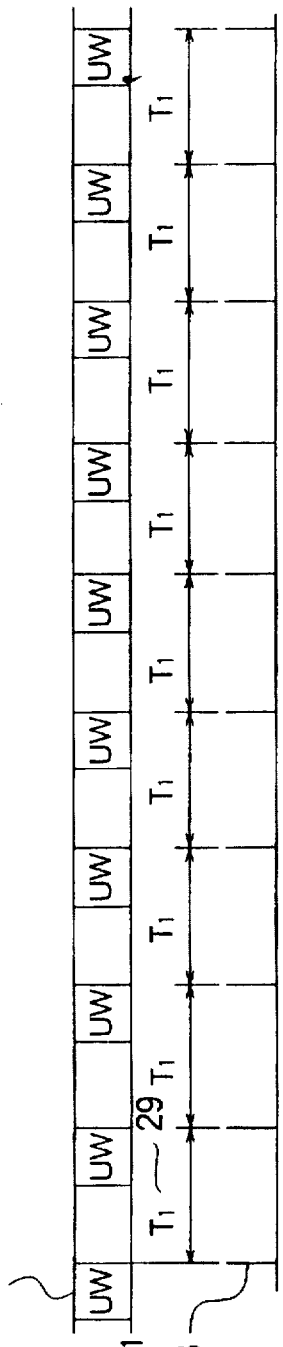
FIG. 3 illustrates a false detection of a frame structure in the embodiment 1.

FIG. 3 shows an example of the false detection of the frame structure flag.

Although the frame remains unchanged from structure 1, the known art may detect a false frame structure flag in the middle, leading to an erroneous determination that the frame is at frame structure 2. According to the embodiment 1, however, it is determined that the frame is at structure 1 based on the matter that the unique word is detected at intervals of T1.

In the embodiment 1, to determine the frame structure, not only the intervals and phase of the unique words but also the determination of the frame structure flag indicative of the frame structure may be used in combination.

As discussed above, the embodiment 1 allows the frame structure to be determined without using the frame structure flag, and thus, even with the frame structure flag going missed, the frame structure can be determined.

According to the embodiment 1, the receiver comprises the frame structure determining module 10 for determining the frame structure based on the detected intervals and phase in the unique word detection information and outputting the determination results, the frame structure is predicted without the frame structure flag. Even when the frame structure flag misses, the frame structure is predicted.

Embodiment 2

Figure 4:
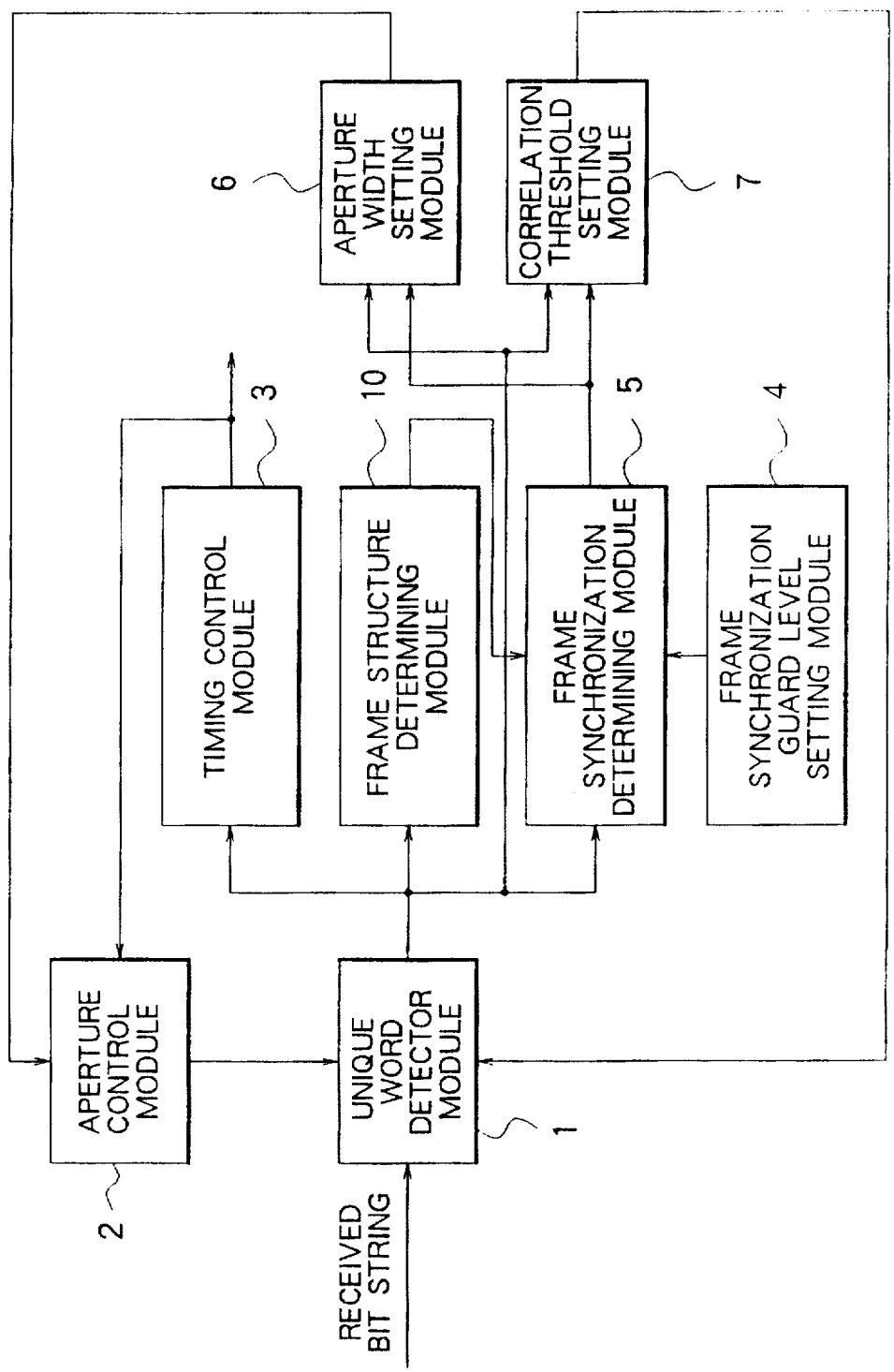
FIG. 4 is a block diagram showing the configuration of the digital radio communications receiver according to an embodiment 2 of the present invention.

FIG. 4 is the block diagram showing the configuration of the digital radio communications receiver in the embodiment 2 of the present invention.

In the embodiment 2, the frame synchronization determining module 5 determines the frame synchronization based on the frame structure information from the frame structure determining module 10 in order to perform frame synchronization control.

In FIG. 4, components identical to those in the embodiment 1 in FIG. 1 are designated with the same reference numerals. In FIG. 4, the frame synchronization determining module 5 is designed to receive the frame structure information from the frame structure determining module 10 so that the frame synchronization control procedure corresponding to the frame structure information is selected.

The operation of the embodiment 2 in FIG. 4 is now discussed.

Referring to FIG. 4, the operation of the unique word detector module 1 for outputting the unique word detection information and the operation of the timing control module 3 remain identical to those in the embodiment 1, and their discussion is not repeated.

The frame structure determining module 10 determines the frame structure based on the unique word detection information, and outputs the determination results as the frame structure information.

The frame synchronization determining module 5 determines the frame synchronization state using the number of consecutive detections or the number of consecutive misses of the unique word detection information designated by the guard level setting module 4, based on the frame structure information from the frame structure determining module 10, and outputs the determination results as the frame synchronization information.

The operations of the aperture width setting module 6 and correlation threshold setting module 7 are identical those in the embodiment 1 and thus are not discussed again herein.

The embodiment 2 is different from the known art in that the frame structure determining module 10 predicts the frame structure based on the detected intervals and phase of the unique words in the unique word detection information and that the frame synchronization determining module 5 determines the frame synchronization using the frame structure information derived from the frame structure determining module 10.

The frame structure determining module 10 determines the frame structure based on the unique word detection information in the same way as in the embodiment 1, and offers the same advantage as in the embodiment 1.

Figure 5:
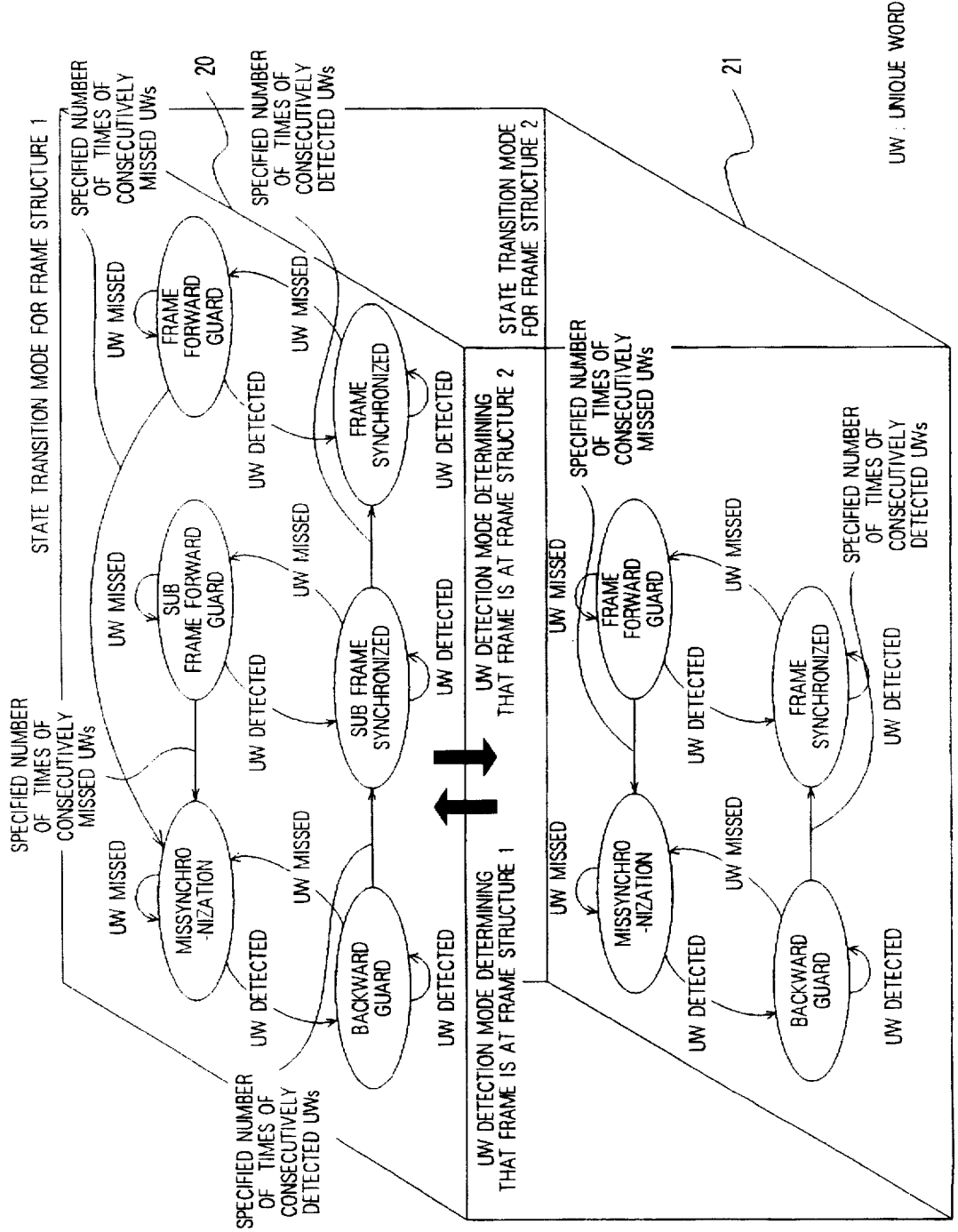
FIG. 5 is a state transition chart of frame synchronization, according to which the digital radio communications receiver of the embodiment 2 of the present invention operates.

Based on the determination results of the frame structure, as shown in FIG. 5, the frame synchronization determining module 5 changes the frame synchronization control procedure from state transition mode 20 to 21 or from state transition mode 21 to mode 20, and thus permits flexible frame synchronization control. Namely, the state transition mode 20 is selected when it is determined that the frame structure is at frame structure 1, and the state transition mode 21 is selected when it is determined that the frame structure is at frame structure 2. Thus, two different state transition modes are selectively used as shown in FIG. 5.

When it is determined that the frame structure is at frame structure 1, the frame synchronization determining module 5 operates from missynchronization to frame synchronization as follows. At the detection of a unique word (UW), the frame synchronization determining module 5 shifts from the missynchronous state in the mode 20 to the backward guard state in the mode 20. When the consecutive detection count of the UWs gets equal to the frame synchronization guard level, the frame synchronization determining module 5 shifts from the backward guard state to a sub frame synchronization established state in the mode 20 where synchronization is partly established, but has yet to reach the frame synchronization. When UWs are consecutively detected at predetermined guard level, the frame synchronization determining module 5 reaches the frame synchronization state in the mode 20.

In this state, when it is determined that the frame is at frame structure 2, the frame synchronization determining module 5 goes to the frame synchronization established state in the state transition mode 21, and thereafter the state transition mode 21 is used.

On the other hand, when it is determined that the frame is at frame structure 2, the frame synchronization determining module 5 operates from the missynchronization to the frame synchronization as follows.

The frame synchronization determining module 5 goes to the backward guard state in the state transition mode 21 from the missynchronization in the state transition mode 21, when a UW is detected. When the consecutive detection count of the UWs gets equal to the frame synchronization guard level, the frame synchronization determining module 5 shifts from the backward guard state to a frame synchronization established state in the mode 21. In this state, if, through the frame structure information, it is determined that the frame is at frame structure 1, the frame synchronization determining module 5 goes to the frame synchronization established state in the state transition mode 20, and the state transition mode 20 is used thereafter.

According to the embodiment 2, the frame structure is determined without determining the frame structure flag, and frame synchronization control appropriate for the frame structure is permitted.

In the embodiment 2, in the same way as in the embodiment 1, not only the intervals and phase of the unique words but also the determination of the frame structure flag indicative of the frame structure may be used in combination, to determine the frame structure.

As discussed above, the embodiment 2 allows the frame structure to be determined without using the frame structure flag, and thus, with the frame structure flag missing, the frame structure is determined. Since the frame synchronization control procedure is changed according to the determined frame structure, the frame synchronization control appropriate for the frame structure is performed.

Embodiment 3

Figure 6:
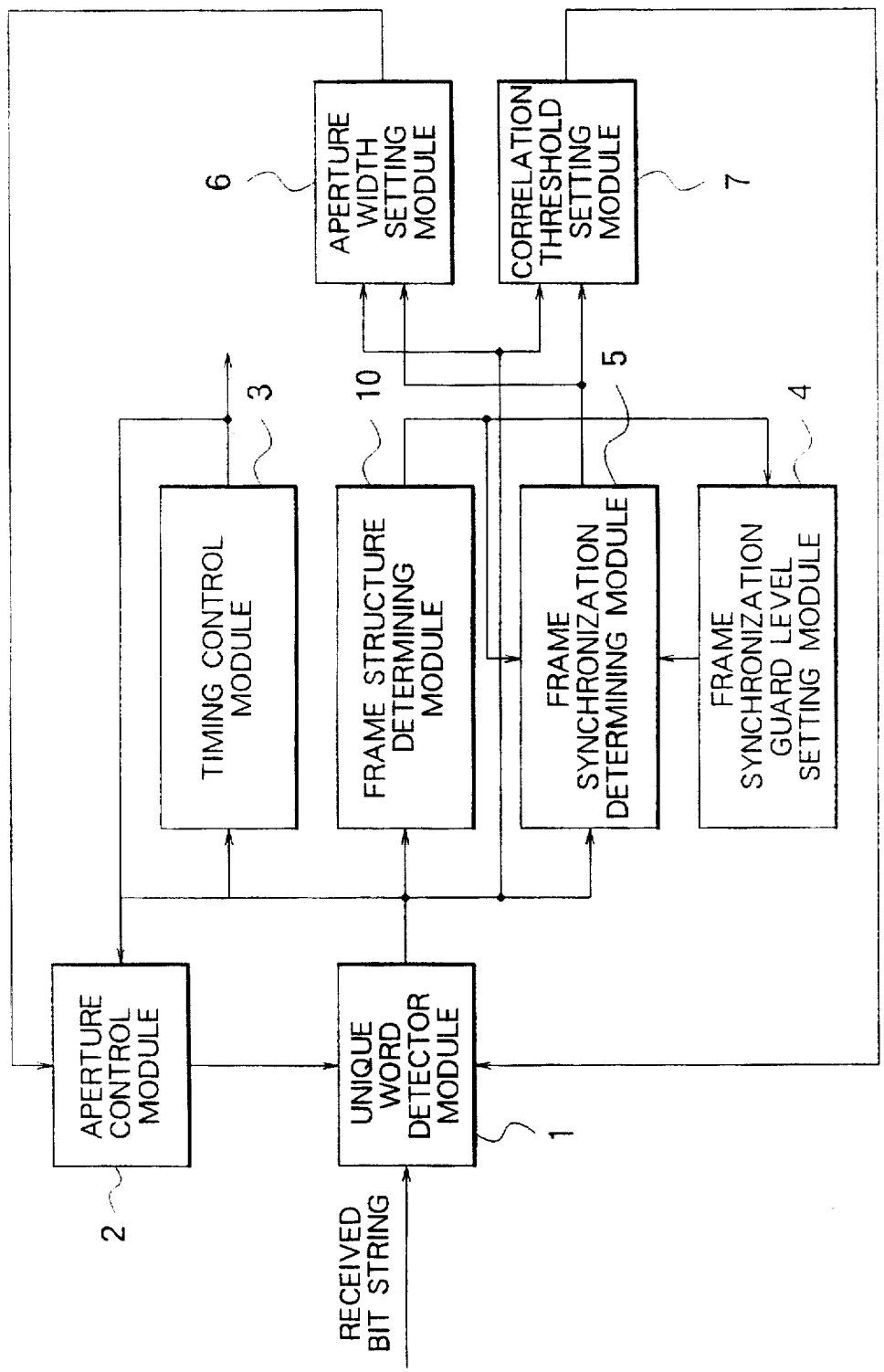
FIG. 6 is a block diagram showing the configuration of the digital radio communications receiver according to an embodiment 3 of the present invention.

FIG. 6 is the block diagram showing the configuration of the digital radio communications receiver in the embodiment 3 of the present invention.

In the embodiment 3, the guard level setting module 4 sets the frame synchronization guard level based on the frame structure information from the frame structure determining module 10.

In FIG. 6, components identical to those in the embodiment 2 in FIG. 4 are designated with the same reference numerals. As shown, the guard level setting module 4 is newly designed to receive the frame structure information as well, and the frame synchronization control is performed using the guard level set.

Referring to FIG. 6, the operation of the embodiment 3 is now discussed.

In FIG. 6, the operation of the unique word detector module 1 for outputting the unique word detection information and the operation of the timing control module 3 are identical to those for the embodiment 1, and are not discussed again.

The frame structure determining module 10 determines the frame structure based on the unique word detection information, and outputs the determination results as the frame structure information.

The guard level setting module 4 sets the guard level appropriate for each receive frame based on the frame structure information from the frame structure determining module 10. For example, the backward guard level during frame missynchronization is set to "2" in the frame structure 1, and the backward guard level during frame missynchronization is set to "4" in the frame structure 2.

The frame synchronization determining module 5 determines the frame synchronization state based on the frame structure information from the frame structure determining module 10 and the number of consecutive detections or the number of consecutive misses in the unique word detection information that are guard level specified by the frame synchronization guard level setting module 4. The frame synchronization determining module 5 then outputs the determination results as the frame synchronization information.

The operations of the aperture width setting module 6 and correlation threshold setting module 7 are identical to those in the embodiment 1 and thus are not discussed again herein.

The embodiment 3 is different from the embodiment 2 in that the frame synchronization guard level is set using the frame structure information from the frame structure determining module 10, and thus allows the frame synchronization control appropriate for the frame structure to be performed.

It is obvious that the embodiment 3 offers the same advantage as the embodiment 1 when the embodiment 3 determines the frame structure based on the unique word.

Since the state transition modes for the frame synchronization control and the frame synchronization guard level are changed based on the determination results of the frame structure, a flexible frame synchronization control is performed.

As discussed above, the embodiment 3 allows the frame structure to be determined without using the frame structure flag, and the frame synchronization control appropriate for the frame structure is possible.

In the embodiment 3, in the same way as in the embodiment 1, not only the intervals and phase of the unique words but also the determination of the frame structure flag indicative of the frame structure may be used in combination, to determine the frame structure.

As discussed above, the embodiment 3 allows the frame structure to be determined without using the frame structure flag, and thus, even with the frame structure flag missing, the frame structure can be determined. Since the state transition modes for the frame synchronization control and the of frame synchronization guard level are changed based on the determination results of the frame structure, a flexible frame synchronization control appropriate for each frame structure is performed.

Embodiment 4

Figure 7:
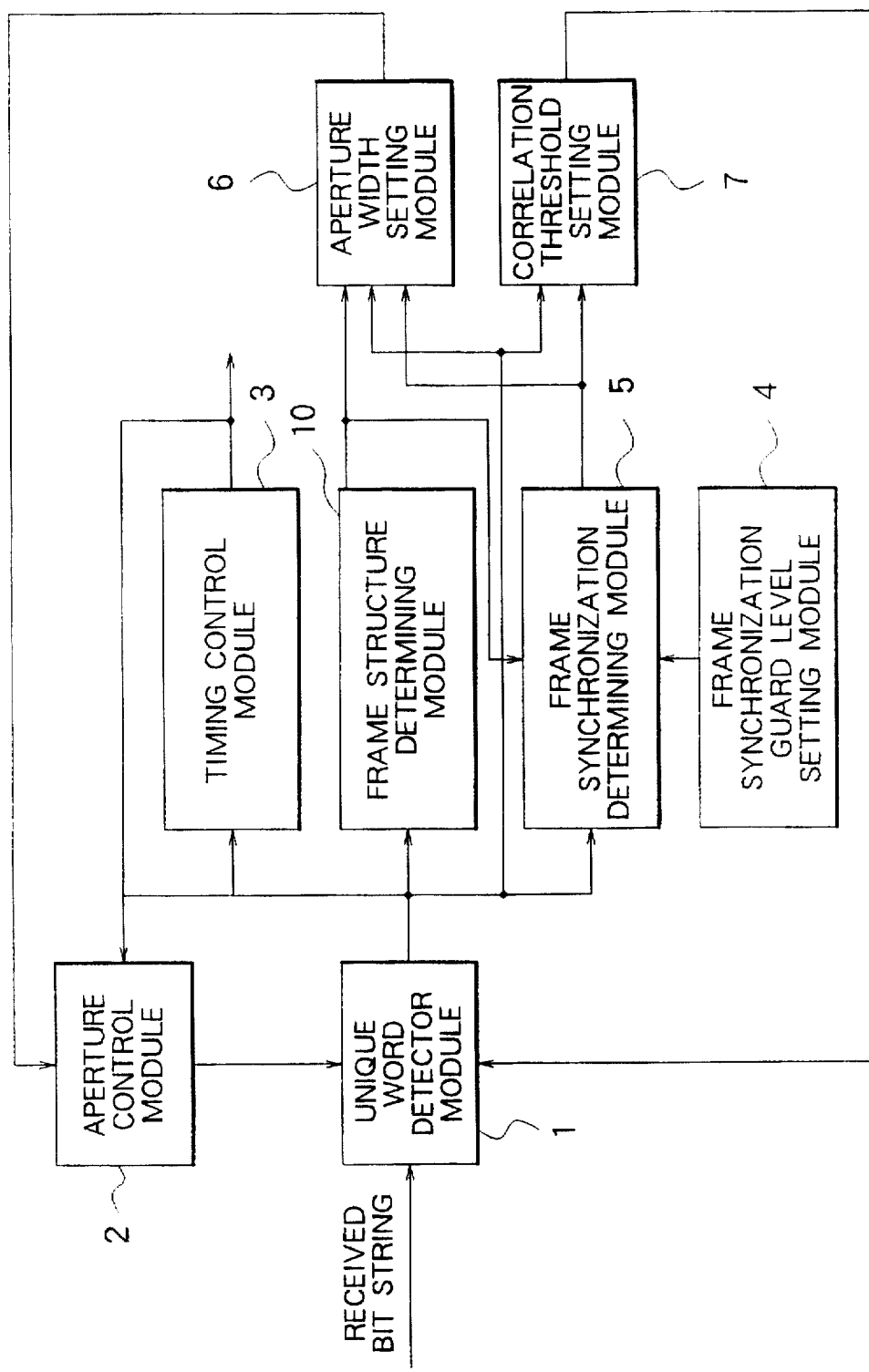
FIG. 7 is a block diagram showing the configuration of the digital radio communications receiver according to an embodiment 4 of the present invention.

FIG. 7 is the block diagram showing the configuration of the digital radio communications receiver in the embodiment 4 of the present invention.

In the embodiment 4, the aperture width setting module 6 included in the receive timing control means sets the aperture width, based on the unique word detection information from the unique word detector module 1, the frame structure information from the frame structure determining module 10, and the frame synchronization information from the frame synchronization determining module 5.

In FIG. 7, components identical to those with reference to the embodiment 2 in FIG. 4 are designated with the same reference numerals. As shown, the aperture width setting module 6 is newly designed to receive the frame structure information from the frame structure determining module 10 as well, and sets the aperture width based on the frame structure information.

The operation of the embodiment 4 is now discussed referring to FIG. 7.

In FIG. 7, the unique word detector module 1 for outputting the unique word detection information, timing control module 3, frame structure determining module 10, and frame synchronization determining module 5 all operate in the same way as in the embodiment 3, and thus the discussion of their operation is not repeated herein.

The aperture width setting module 6 sets the aperture width based on the unique word detection information, frame structure information, and frame synchronization information, and outputs the aperture width. The aperture width is, for example, "0" for the frame structure 1 during frame synchronization and "1" for the frame structure 2 during frame synchronization.

The operation of the correlation threshold setting module 7 remains identical to that in the embodiment 2, and its discussion is not repeated herein.

The embodiment 4 is different from the embodiment 2 in that the aperture width setting module 6 sets the aperture width based on not only the unique word detection information and frame synchronization information but the frame structure information from the frame structure determining module 10.

It is obvious that the embodiment 4 offers the same advantage as embodiment 1 when the embodiment 4 determines the frame structure based on the unique word.

Since the state transition modes for the frame synchronization control and the aperture width are modified according to the determination results of the frame structure, a flexible frame synchronization control is possible.

As discussed above, the embodiment 4 allows the frame structure to be determined without determining the frame structure flag, and the frame synchronization control appropriate for the frame structure is possible.

In the embodiment 4, in the same way as in the embodiment 2, not only the intervals and phase of the unique words but also the determination of the frame structure flag may be used in combination, to determine the frame structure.

As discussed above, the embodiment 4 allows the frame structure to be determined without using the frame structure flag, and thus, even with the frame structure flag going undetected, the frame structure can be determined. Since the state transition modes for the frame synchronization control, the frame synchronization guard level and the aperture width are modified based on the determination results of the frame structure, a flexible frame synchronization control appropriate for each frame structure is performed.

Embodiment 5

Figure 8:
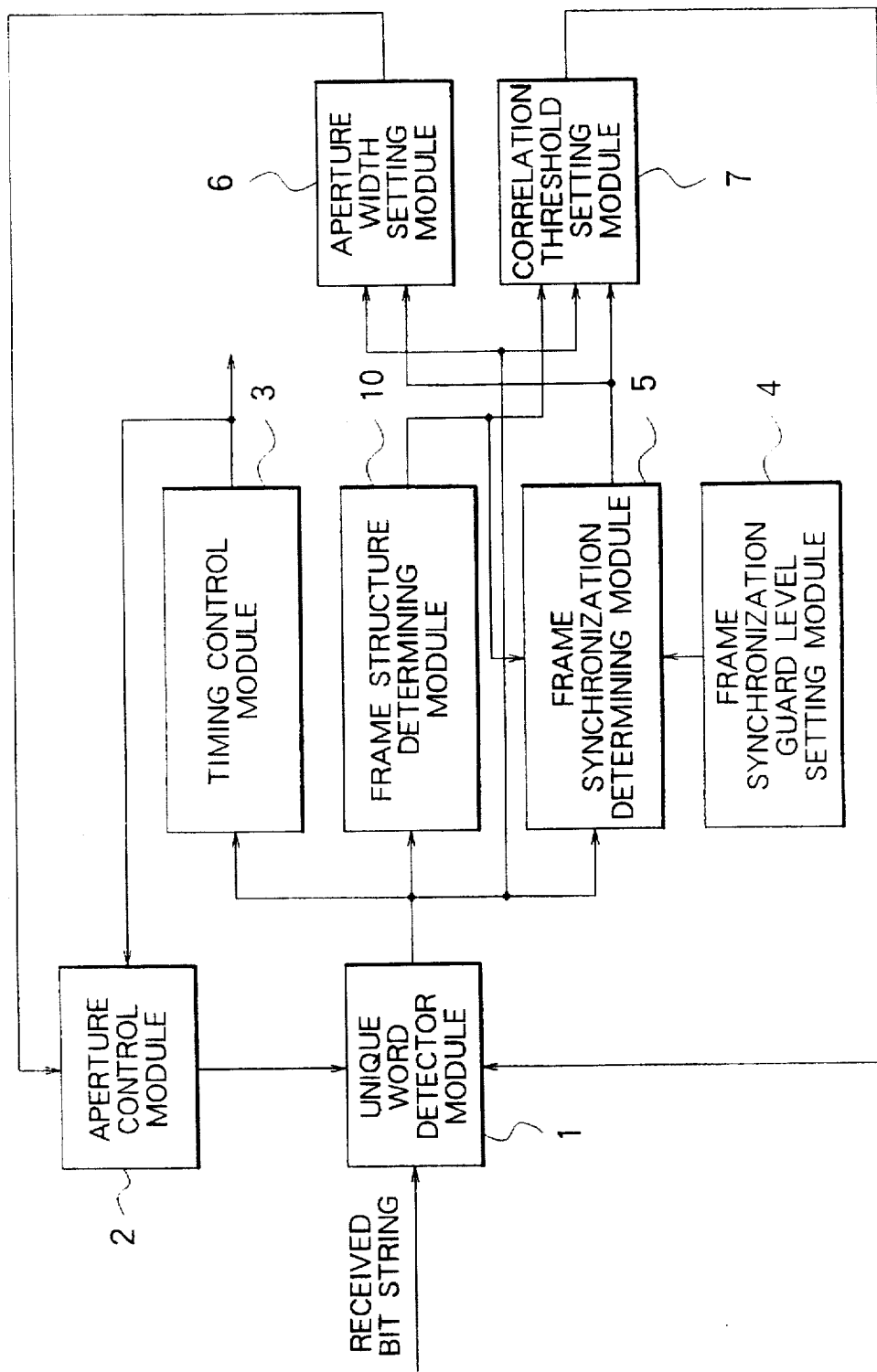
FIG. 8 is a block diagram showing the configuration of the digital radio communications receiver according to an embodiment 5 of the present invention.

FIG. 8 is the block diagram showing the configuration of the digital radio communications receiver in an embodiment 5 of the present invention.

To perform frame synchronization control in the embodiment 5, the correlation threshold setting module 7 sets the correlation threshold based on the unique word detection information from the unique word detector module 1, the frame structure information from the frame structure determining module 10, and the frame synchronization information from the frame synchronization determining module 5.

In FIG. 8, components identical to those with reference to the embodiment 2 in FIG. 4 are designated with the same reference numerals. As shown, the correlation threshold setting module 7 is newly designed to receive from the frame structure determining module 10 the frame structure information, which is also used in setting the correlation threshold.

The operation of the embodiment 5 is now discussed referring to FIG. 8.

As shown, the unique word detector module 1 for outputting the unique word detection information, timing control module 3, frame structure determining module 10, frame synchronization determining module 5 and aperture width setting module 6 all operate in the same way as in the embodiment 2, and thus the discussion of their operation is not repeated herein.

The correlation threshold setting module 7 sets the correlation threshold, based on the unique word detection information from the unique word detector module 1, the frame structure information from the frame structure determining module 10, and the frame synchronization information from the frame synchronization determining module 5, and outputs the correlation threshold. The correlation threshold is, for example, "2" for the frame structure 1 during frame synchronization, and "6" for the frame structure 2 during frame synchronization.

The embodiment 5 is different from the embodiment 2 in that the correlation threshold setting module 7 sets the correlation threshold based on not only the unique word detection information and frame synchronization information but the frame structure information from the frame structure determining module 10.

It is obvious that the embodiment 5 offers the same advantage as the embodiment 1 when the embodiment 5 determines the frame structure based on the unique word.

Since the state transition modes for the frame synchronization control and the correlation threshold are modified according to the determination results of the frame structure, a flexible frame synchronization control is possible.

As discussed above, the embodiment 5 allows the frame structure to be determined without determining the frame structure flag, and the frame synchronization control appropriate for the frame structure is possible.

In the embodiment 5, in the same way as in the embodiment 2, not only the intervals and phase of the unique words but also the determination of the frame structure flag may be used in combination, to determine the frame structure.

As discussed above, the embodiment 5 allows the frame structure to be determined without using the frame structure flag, and thus, even with the frame structure flag missing, the frame structure can be determined. Since the state transition modes for the frame synchronization control and the correlation threshold are changed based on the determination results of the frame structure, a flexible frame synchronization control appropriate for each frame structure is performed.

Embodiment 6

Figure 9:
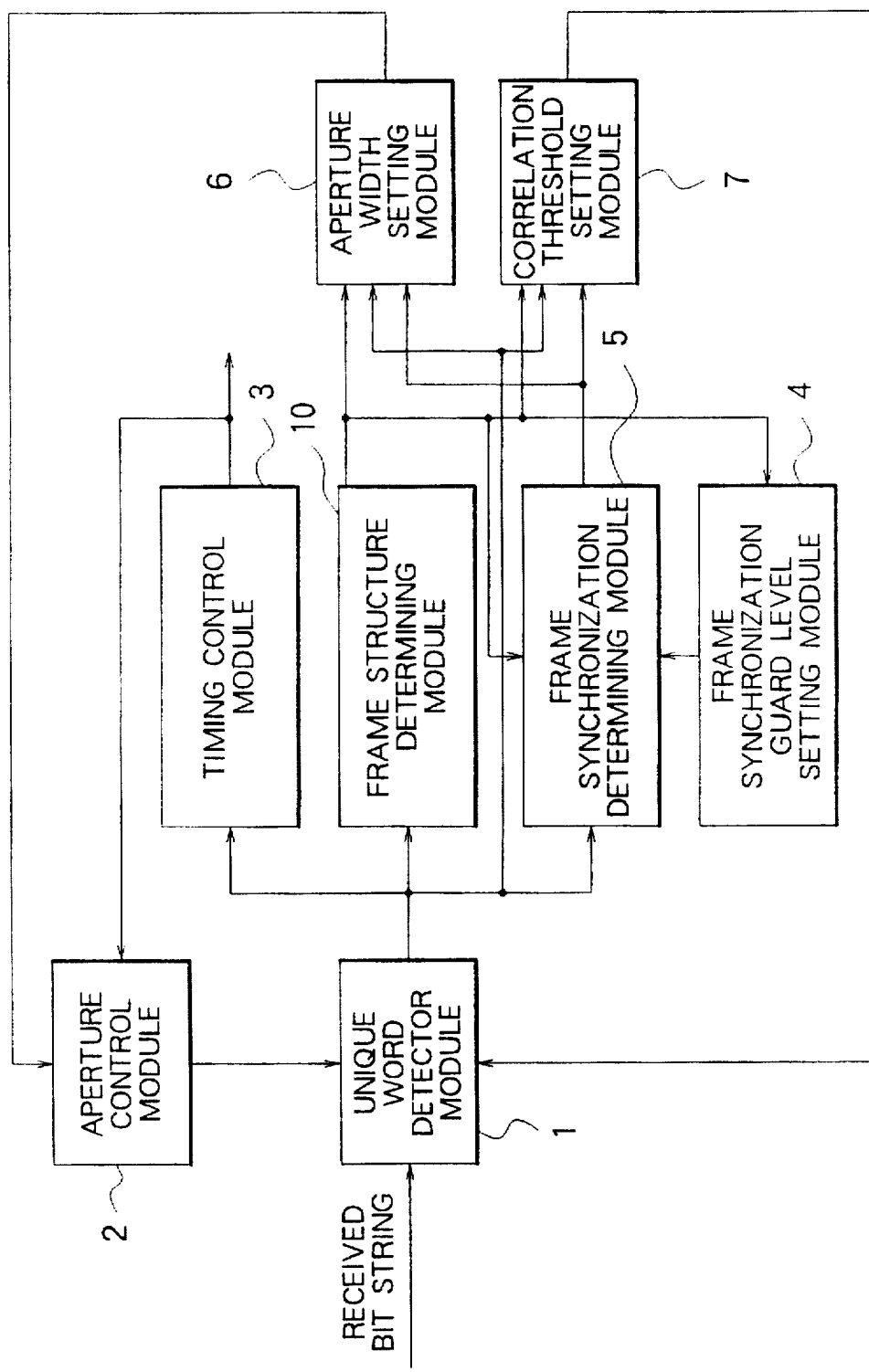
FIG. 9 is a block diagram showing the configuration of the digital radio communications receiver according to an embodiment 6 of the present invention.

FIG. 9 is the block diagram showing the configuration of the digital radio communications receiver in the embodiment 6 of the present invention.

To perform frame synchronization control in the embodiment 6, the determination results of the frame structure derived from the unique word are fed to not only the frame synchronization determining module 5 but also the guard level setting module 4, aperture width setting module 6 and correlation threshold setting module 7.

In FIG. 9, components identical to those in the embodiment 2 in FIG. 4 are designated with the same reference numerals. As shown, the guard level setting module 4, aperture width setting module 6 and correlation threshold setting module 7 are newly designed to receive the frame structure information from the frame structure determining module 10 as well.

The operation of the embodiment 6 is now discussed referring to FIG. 9.

As shown, the unique word detector module 1 for outputting the unique word detection information, timing control module 3, frame structure determining module 10, and frame synchronization determining module 5 all operate in the same way as in the embodiment 2, and thus the discussion of their operation is not repeated herein.

The frame synchronization guard level setting module sets the guard level appropriate for each receive frame structure, based on the frame structure information from the frame structure determining module 10.

The aperture width setting module 6 sets the aperture width, based on the unique word detection information from the unique word detector module 1, the frame structure information from the frame structure determining module 10, and the frame synchronization information from the frame synchronization determining module 5, and outputs the aperture width.

The correlation threshold setting module 7 sets the correlation threshold, based on the unique word detection information from the unique word detector module 1, the frame structure information from the frame structure determining module 10, and the frame synchronization information from the frame synchronization determining module 5, and outputs the correlation threshold.

The embodiment 6 is different from the embodiment 2 in that the frame synchronization guard level setting module aperture width setting module 6 and correlation threshold setting module 7 set themselves based on not only the unique word detection information and frame synchronization information but the frame structure information from the frame structure determining module 10.

It is obvious that the embodiment 6 offers the same advantage as the embodiment 1 when the embodiment 6 determines the frame structure based on the unique word.

Since the state transition modes for the frame synchronization control, the frame synchronization guard level, the aperture width and the correlation threshold are changed based on the determination results of the frame structure, a flexible frame synchronization control is performed.

As discussed above, the embodiment 6 allows the frame structure to be determined without using the frame structure flag, and the frame synchronization control appropriate for the frame structure is possible.

In the embodiment 6, in the same way as in the embodiment 2, not only the intervals and phase of the unique words but also the determination of the frame structure flag indicative of the frame structure may be used in combination, to determine the frame structure.

As discussed above, the embodiment 6 allows the frame structure to be determined without using the frame structure flag, and thus, even with the frame structure flag missing, the frame structure can be determined. Since the state transition modes for the frame synchronization control, the frame synchronization guard level, the aperture width and the correlation threshold are changed based on the determination results of the frame structure, a flexible frame synchronization control appropriate for each frame structure is performed.

What is claimed is:

1. A digital radio communications receiver for use in a digital communications system having two or more frame structures on a single channel, comprising unique word detector means for detecting a unique word from a received bit string, receive timing control means for timing controlling a received frame based on a unique word detection information from said unique word detector means, frame synchronization determining means for determining the establishment of the synchronization of the received frame based on the unique word detection information from said unique word detector means and based on a frame synchronization guard level and for outputting the determination results as frame synchronization information, and frame structure determining means for determining the frame structure based on the unique word detection information from said unique word detector means and for outputting the determination results as frame structure information.

2. The digital radio communications receiver according to claim 1, wherein said frame synchronization determining means selects the mode of a frame synchronization control based on the frame structure information from said frame structure determining means.

3. The digital radio communications receiver according to claim 1 further comprising guard level setting means for setting the frame synchronization guard level that is the number of consecutive detections or the number of consecutive misses of the unique word of the frame synchronization determining condition based on the frame structure information from said frame structure determining means.

4. The digital radio communications receiver according to claim 1 further comprising aperture width setting means for setting an aperture width that is a time width within which the unique word is detected based on the unique word detection information from said unique word detector means, the frame structure information from said frame structure determining means and the frame synchronization information from said frame synchronization determining means.

5. The digital radio communications receiver according to claim 1 further comprising correlation threshold setting means for setting the correlation threshold of unique word detection conditions, based on the unique word detection information from said unique word detector means, the frame structure information from said frame structure determining means and the frame synchronization information from said frame synchronization determining means.

\* \* \* \* \*